United States Patent
Nagasawa et al.

(10) Patent No.: US 11,860,456 B2
(45) Date of Patent: Jan. 2, 2024

(54) LIQUID CRYSTAL DEVICE AND DISPLAY DEVICE

(71) Applicant: Japan Display Inc., Tokyo (JP)

(72) Inventors: Junko Nagasawa, Tokyo (JP); Jin Hirosawa, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/940,087

(22) Filed: Sep. 8, 2022

(65) Prior Publication Data
US 2023/0073297 A1    Mar. 9, 2023

(51) Int. Cl.
  *G02F 1/1335*  (2006.01)
  *G02F 1/1343*  (2006.01)
  *G02F 1/1337*  (2006.01)

(52) U.S. Cl.
  CPC ...... *G02F 1/133512* (2013.01); *G02F 1/1337* (2013.01); *G02F 1/134309* (2013.01)

(58) Field of Classification Search
  None
  See application file for complete search history.

(56) References Cited

U.S. PATENT DOCUMENTS

| | | | |
|---|---|---|---|
| 2013/0044268 A1* | 2/2013 | Chen | G02B 27/0018 359/465 |
| 2015/0302808 A1* | 10/2015 | Wang | G09G 3/3614 349/44 |
| 2015/0309360 A1* | 10/2015 | Wang | G02F 1/133514 345/694 |
| 2019/0025635 A1* | 1/2019 | Chen | G02F 1/136286 |
| 2021/0255512 A1* | 8/2021 | Sugiura | G02F 1/136286 |
| 2022/0003902 A1* | 1/2022 | Kim | G02B 5/003 |
| 2022/0059804 A1* | 2/2022 | Hong | H01L 25/0753 |
| 2022/0252951 A1* | 8/2022 | Kabe | G02F 1/1508 |
| 2022/0299787 A1* | 9/2022 | Chen | G02B 27/30 |
| 2023/0072237 A1* | 3/2023 | Nagasawa | G02F 1/1337 |

FOREIGN PATENT DOCUMENTS

JP    2004-20725 A    1/2004

* cited by examiner

*Primary Examiner* — Ryan Crockett
(74) *Attorney, Agent, or Firm* — XSENSUS LLP

(57) ABSTRACT

According to one embodiment, a liquid crystal device includes a plurality of first light-shielding members arranged at a first pitch, a first organic insulating film covering the first light-shielding members, a plurality of second light-shielding members overlapping the first light-shielding members, a second organic insulating film covering the second light-shielding members, a plurality of third light-shielding members overlapping the second light-shielding members, a third organic insulating film covering the third light-shielding members, and a plurality of first electrodes arranged at a second pitch that is smaller than the first pitch.

9 Claims, 14 Drawing Sheets

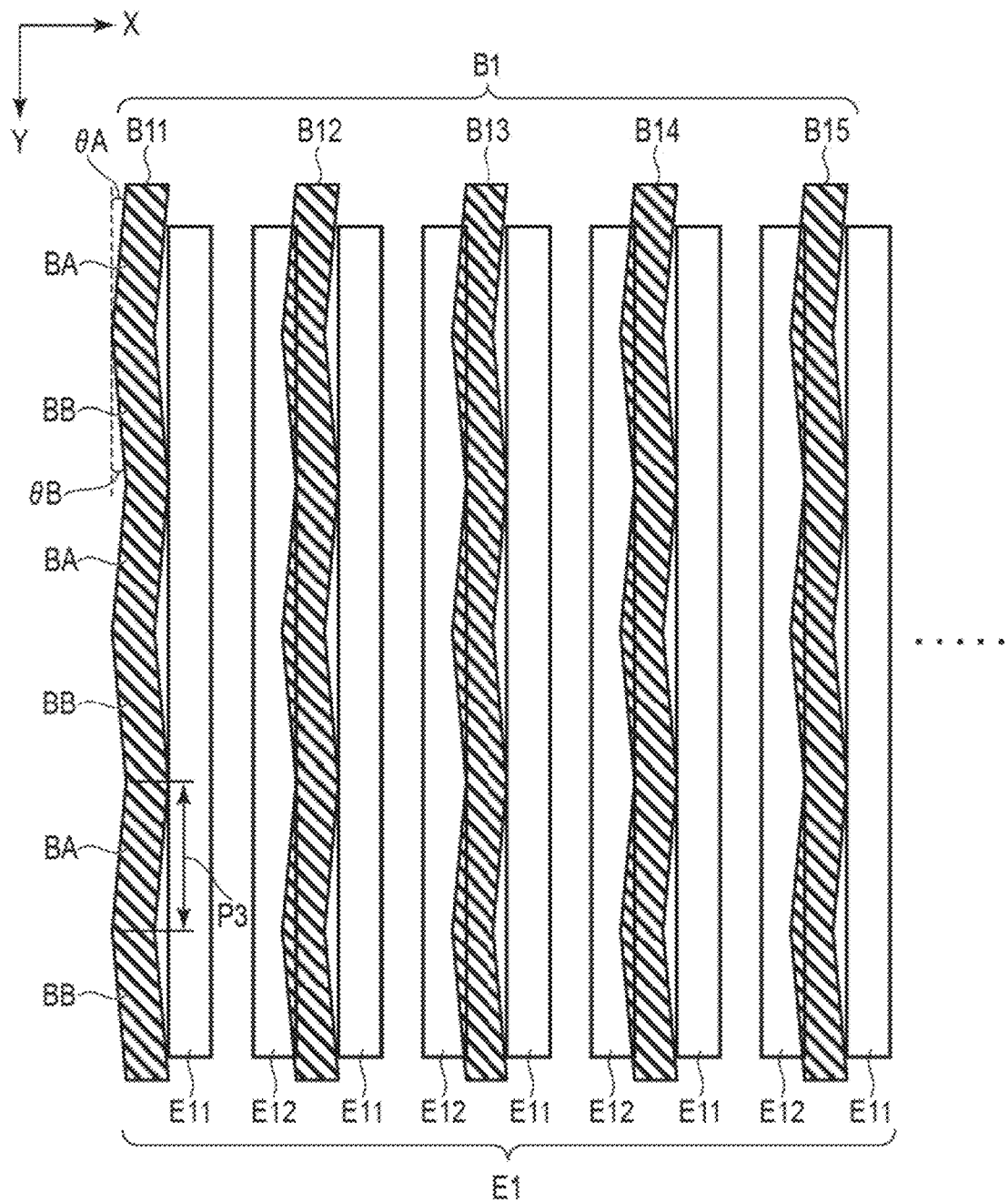
F I G. 10

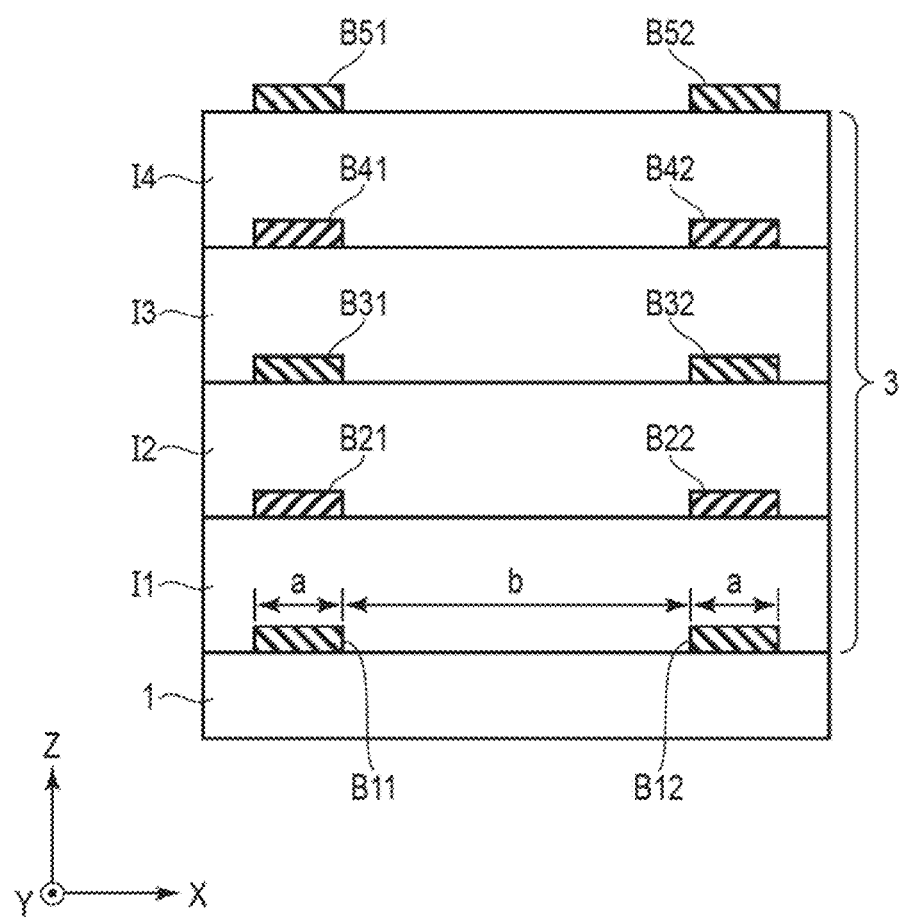
F I G. 14

LIQUID CRYSTAL DEVICE AND DISPLAY DEVICE

CROSS-REFERENCE TO RELATED APPLICATIONS

This application is based upon and claims the benefit of priority from Japanese Patent Application No. 2021-146250, filed Sep. 8, 2021, the entire contents of which are incorporated herein by reference.

FIELD

Embodiments described herein relate generally to a liquid crystal device and a display device.

BACKGROUND

In recent years, a variety of optical elements which adhere to the display surface of a liquid crystal panel to control a viewing angle have been proposed. The optical elements include, for example, a louver layer that limits the transmission angle of light. The louver layer is formed by stacking a light-transmitting layer and a light-shielding layer alternately. The bonding surface between the light-transmitting layer and the light-shielding layer is inclined at a predetermined angle with respect to the thickness direction of the louver layer.

If the above-described optical elements are externally applied to a device, the overall thickness of the device increases.

BRIEF DESCRIPTION OF THE DRAWINGS

FIG. 10 is a plan view showing the first electrode E1 and another light-shielding layer B1.

FIG. 14 is a diagram illustrating the aperture ratio of the louver portion 3.

DETAILED DESCRIPTION

Figure 1:
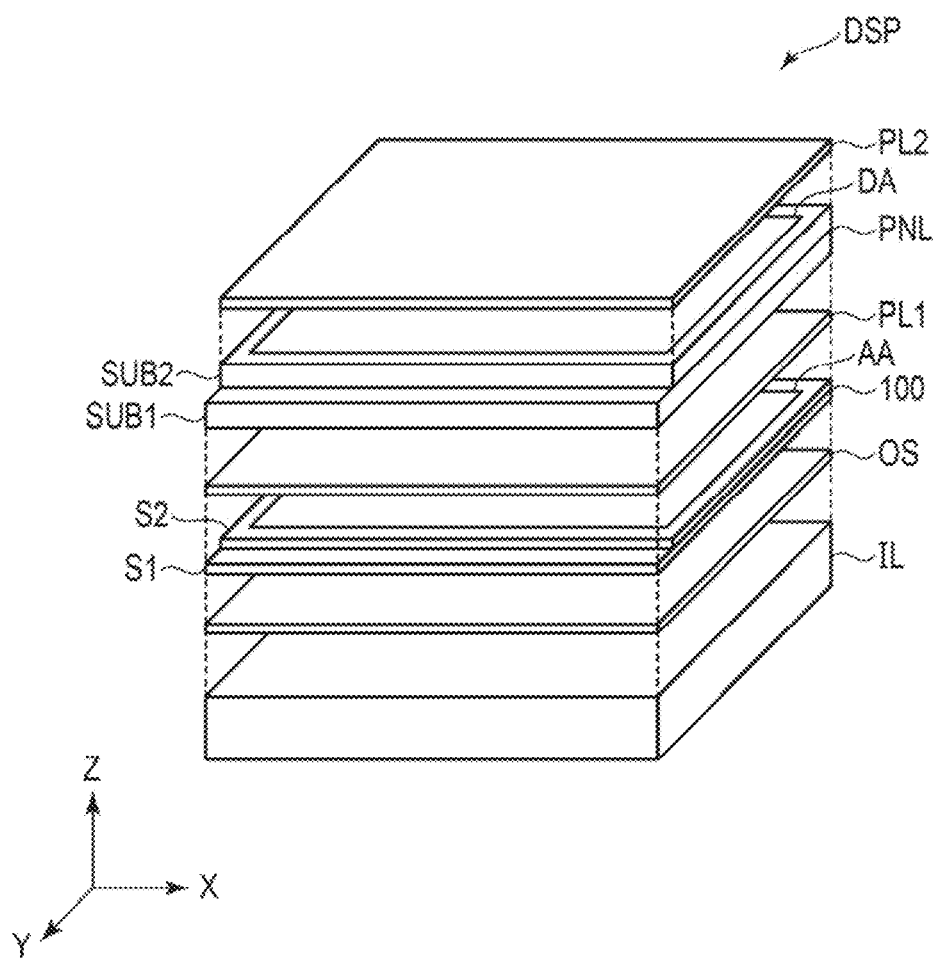
FIG. 1 is an exploded perspective view showing a display device DSP according to an embodiment.

In general, according to one embodiment, a liquid crystal device includes, a first transparent substrate, a plurality of first light-shielding members each formed in a strip shape and arranged at a first pitch on an inner surface of the first transparent substrate, a first organic insulating film which is transparent and covers the first light-shielding members, a plurality of second light-shielding members which overlap the first light-shielding members, respectively and each of which is formed in a strip shape parallel to the first light-shielding members, a second organic insulating film which is transparent and covers the second light-shielding members, a plurality of third light-shielding members which overlap the second light-shielding members, respectively and each of which is formed in a strip shape parallel to the second light-shielding members, a third organic insulating film which is transparent and covers the third light-shielding members, an overcoat layer disposed above the third organic insulating film, a plurality of first electrodes each formed in a strip shape and arranged on the overcoat layer at a second pitch that is smaller than the first pitch, a first alignment film which covers the first electrodes, a second transparent substrate, a second electrode disposed on an inner surface of the second transparent substrate and opposed to the first electrodes, a second alignment film which covers the second electrode, and a liquid crystal layer disposed between the first alignment film and the second alignment film.

According to another embodiment, a display device includes an illumination device, a display panel including a plurality of pixels arranged in a matrix, and a liquid crystal device disposed between the illumination device and the display panel. The liquid crystal device includes a first transparent substrate, a louver portion located on the first transparent substrate, an overcoat layer which covers the louver portion, a liquid crystal lens portion located on the overcoat layer, and a second transparent substrate located on the liquid crystal lens portion. The louver portion is disposed between the illumination device and the liquid crystal lens portion.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that in order for the descriptions to be easily understandable, the drawings are illustrated with an X axis, a Y axis and a Z axis which are normal to each other. A direction along the X axis is referred to as an X direction or a first direction, a direction along the Y axis is referred to as a Y direction or a second direction, and a direction along the Z axis is referred to as a Z direction or a third direction. A plane defined by the X axis and the Y axis is referred to as an X-Y plane, and viewing towards the X-Y plane is referred to as a planar view.

FIG. 1 is an exploded perspective view showing a display device DSP according to an embodiment.

The display device DSP includes an illumination device IL, a liquid crystal device 100, a display panel PNL, an optical sheet OS and polarizers PL1 and PL2.

The illumination device IL is configured to emit illumination light toward the display panel PNL. The illumination light is unpolarized light, but may be linearly polarized light, for example.

The optical sheet OS is disposed between the illumination device IL and the liquid crystal device 100 in a third direction Z. The optical sheet OS is, for example, a reflective polarized sheet, and is configured to reflect s-polarized light of the illumination light and transmit p-polarized light thereof.

The liquid crystal device 100 is disposed between the optical sheet OS and the polarizer PL1 in the third direction Z. The liquid crystal device 100 holds a liquid crystal layer between a first substrate S1 and a second substrate S2. The liquid crystal device 100 includes an effective area AA to control the emission direction of incident light (illumination light).

The display panel PNL is disposed between the polarizers PL1 and PL2 in the third direction Z. The display panel PNL is, for example, a liquid crystal panel in which a liquid crystal layer is held between paired substrates SUB1 and SUB2, but may be another display panel as an object to be illuminated by the illumination device IL. The display panel PNL includes a display area DA to display an image. The display area DA overlaps the effective area AA in the third direction Z.

The display panel PNL and the liquid crystal device 100 will be described in detail later.

Figure 2:
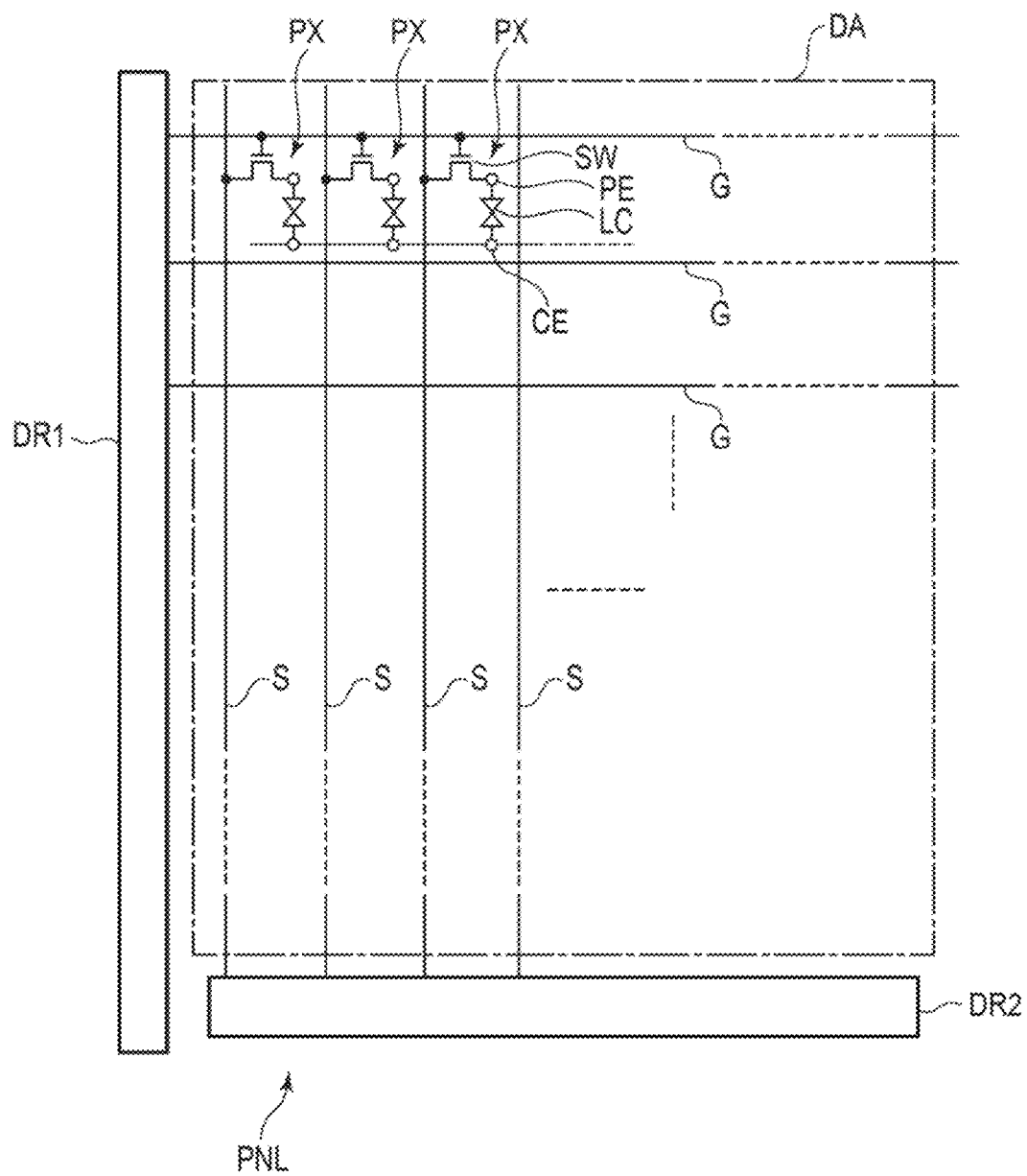
FIG. 2 is a diagram showing an example of an equivalent circuit of a display panel PNL of the display device DSP shown in FIG. 1.

FIG. 2 is a diagram showing an example of an equivalent circuit of the display panel PNL shown in FIG. 1.

The display panel PNL includes a plurality of pixels PX, a plurality of scanning lines G and a plurality of signal lines S in the display area DA. The scanning lines G and signal lines S intersect each other. As one example, the scanning lines G extend in a first direction X shown in FIG. 1, and the signal lines S extend in a second direction Y.

The display panel PNL also includes a first driver DR1 and a second driver DR2 outside the display area DA. The scanning lines G are electrically connected to the first driver DR1. The signal lines S are electrically connected to the second driver DR2. The first and second drivers DR1 and DR2 are controlled by a controller.

The pixels PX shown in FIG. 2 are referred to as subpixels, color pixels, and the like, and correspond to, for example, red pixels for displaying red, green pixels for displaying green, blue pixels for displaying blue, white pixels for displaying white, and the like. These pixels PX are separated by, for example, two adjacent scanning lines G and two adjacent signal lines S.

Each of the pixels PX includes a switching element SW, a pixel electrode PE and a common electrode CE opposed to the pixel electrode PE. The switching element SW is electrically connected to the scanning line G and signal line S. The pixel electrode PE is electrically connected to the switching element SW. That is, the pixel electrode PE is electrically connected to the signal line S via the switching element SW. The common electrode CE is formed over the pixels PX. A common potential is applied to the common electrode CE.

The first driver DR1 supplies a scanning signal to each of the scanning lines G. The second driver DR2 supplies a video signal to each of the signal lines S. In the switching element SW electrically connected to the scanning line G to which a scanning signal is supplied, the signal line S and the pixel electrode PE are conducted, and a voltage corresponding to the video signal supplied to the signal line S is applied to the pixel electrode PE. The liquid crystal layer LC is driven by an electric field generated between the pixel electrode PE and the common electrode CE.

Figure 3:
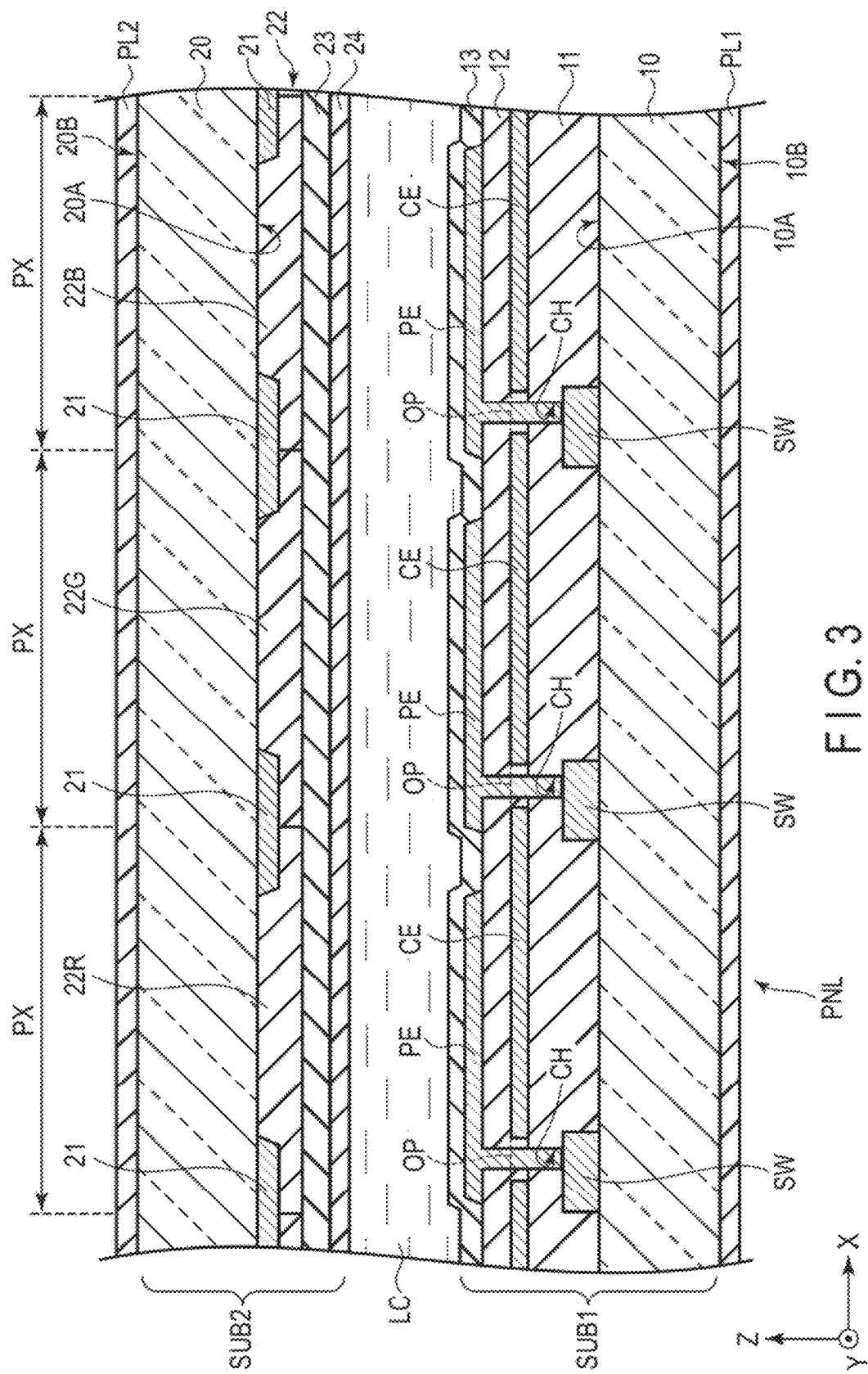
FIG. 3 is a sectional view showing an example of a configuration of the display panel PNL shown in FIG. 1.

FIG. 3 is a sectional view showing an example of a configuration of the display panel PNL shown in FIG. 1.

The display panel PNL includes a substrate SUB1, a substrate SUB2 and a liquid crystal layer LC. Here is a description of a display panel PNL adapted to a display mode using a lateral electric field along the main surface of substrate, but the display panel PNL is not limited to the configuration adapted to the display mode. The display panel PNL has only to be configured to correspond to any of a display mode using a longitudinal electric field along the normal of the main surface, a display mode using an inclined electric field angled with respect to the main surface, and a display mode using an appropriate combination of the lateral electric field, longitudinal electric field and inclined electric field. The main surface is parallel to the X-Y plane.

The substrate SUB1 includes a transparent substrate 10, insulating layers 11 and 12 and an alignment film 13 in addition to the switching element SW, pixel electrode PE and common electrode CE. The substrate SUB1 also includes the scanning lines G, signal lines S, first driver DR1, second driver DR2 and the like shown in FIG. 1. The transparent substrate 10 has an inner surface 10A opposed to the liquid crystal layer LC and an outer surface 10B that is the opposite side of the inner surface 10A. The polarizer PL1 adheres to the outer surface 10B.

The switching element SW is disposed on the inner surface 10A and covered with the insulating layer 11. In the example shown in FIG. 3, for convenience of description, the switching element SW is simplified and the scanning lines G or the signal lines S are not shown. In practice, the insulating layer 11 includes a plurality of insulating layers, and the switching element SW includes semiconductor layers and various electrodes each formed between adjacent insulating layers.

The common electrode CE is disposed over the pixels PX on the insulating layer 11 and covered with the insulating layer 12. The pixel electrode PE of each of the pixels PX is disposed on the insulating layer 12 and opposed to the common electrode CE with the insulating layer 12 therebetween. The pixel electrode PE is electrically connected to the switching element SW through an opening OP of the common electrode CE and a contact hole CH that penetrates the insulating layers 11 and 12. The alignment film 13 covers the pixel electrode PE and the insulating layer 12 and is in contact with the liquid crystal layer LC.

The substrate SUB2 includes a transparent substrate 20, light-shielding layers 21, a color filter layer 22, an overcoat layer 23 and an alignment film 24. The transparent substrate 20 has an inner surface opposed to the liquid crystal layer LC and an outer surface 20B that is the opposite side of the inner surface 20A. The polarizer PL2 adheres to the outer surface 20B.

The light-shielding layers 21 are formed on the inner surface 20A and located on the boundary of adjacent pixels PX. As will be described later, the light-shielding layers 21 are formed in a lattice shape and overlap the scanning and signal lines G and S to partition the pixels PX. The color filter layer 22 includes a red-color filter 22R, a green-color filter 22-G and a blue-color filter 22B. The overcoat layer 23 covers the color filter layer 22. The alignment film 24 covers the overcoat layer 23 and is in contact with the liquid crystal layer LC.

The transparent substrates 10 and 20 are insulating substrates such as a glass substrate and a resin substrate. The pixel electrode PE and the common electrode CE are transparent electrodes formed of a transparent conductive material such as indium tin oxide (ITO) and indium zinc oxide (IZO).

Figure 4:
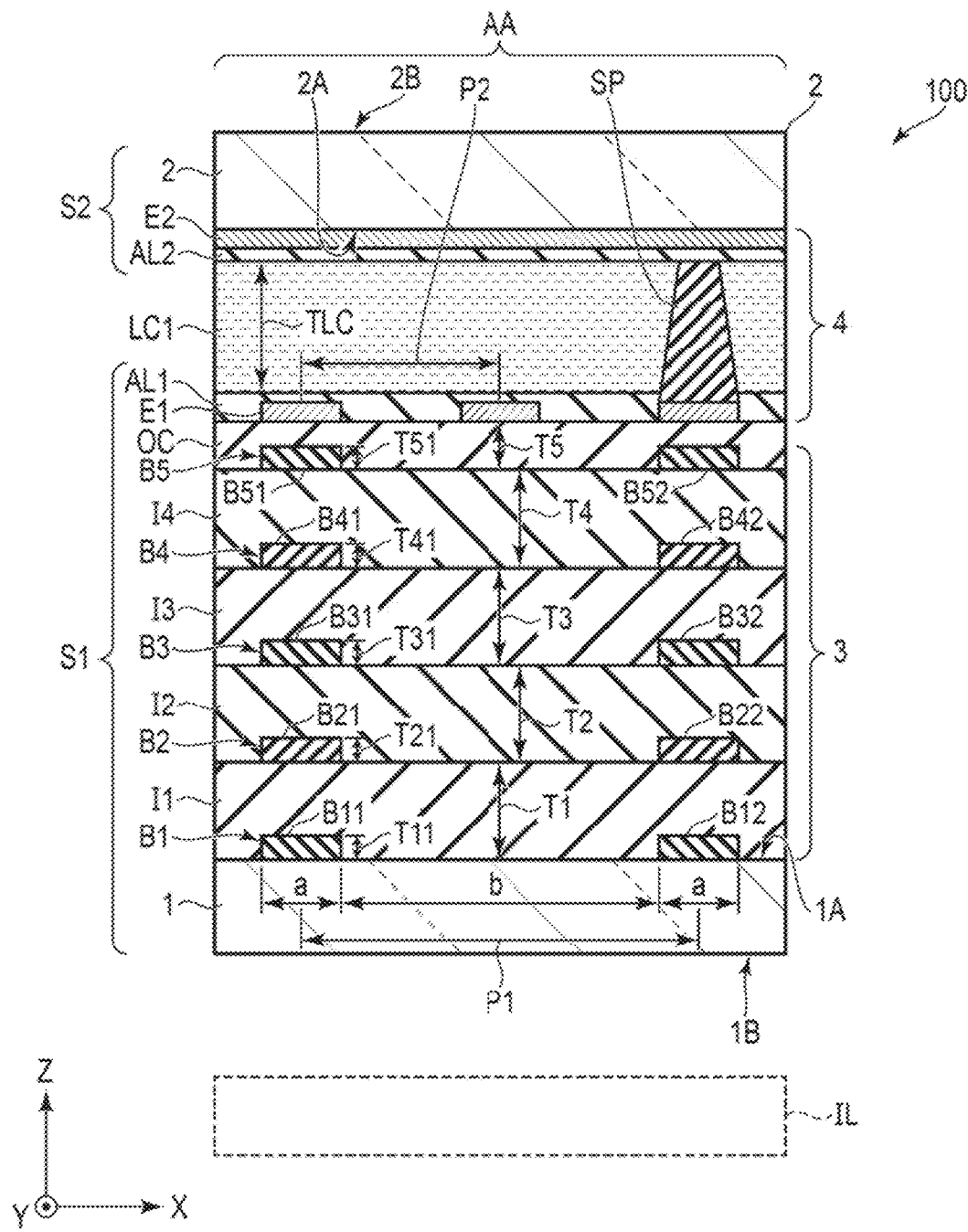
FIG. 4 is a sectional view showing an example of a structure of a liquid crystal device 100 of the display device DSP shown in FIG. 1.

FIG. 4 is a sectional view showing an example of a configuration of the liquid crystal device 100 shown in FIG. 1. Specifically, FIG. 4 shows a sectional configuration of part of the effective area AA.

The liquid crystal device 100 includes a first substrate S1, a second substrate S2 and a liquid crystal layer LC1.

The liquid crystal device 100 includes a louver portion 3 which is disposed between paired transparent substrates 1 and 2 to regulate the emission direction of incident light (illumination light) and collimate the incident light, and a liquid crystal lens portion 4 which adjusts the degree of divergence of the collimated incident light. The louver portion 3 is located between the illumination device IL indicated by a dotted line and the liquid crystal lens portion 4. In the example shown in FIG. 4, the louver portion 3 is built in the first substrate S1. The liquid crystal device 100 is configured to control the emission direction of incident light (illumination light) in the effective region AA by the combination of the louver portion 3 and the liquid crystal lens portion 4. The following is a description of a configuration of each component of the liquid crystal device 100.

The first substrate S1 includes a first transparent substrate 1, a plurality of light-shielding layers B1 to B5, a plurality of organic insulating films I1 to I4, an overcoat layer OC, a plurality of first electrodes S1 and a first alignment film AL1. The louver portion 3 is configured by the light-shielding layers B1 to B5. In the example shown in FIG. 4, the louver portion 3 is configured by five light-shielding layers B1 to B5, but may be configured by two or more light-shielding layers arranged in the third direction Z.

The first transparent substrate 1 has an inner surface 1A opposed to the liquid crystal layer LC1 and an outer surface 1B that is the opposite side of the inner surface 1A. The outer surface 1B is opposed to the optical sheet OS shown in FIG. 1.

The light-shielding layer B1 includes a plurality of light-shielding members B11 and B12 disposed on the inner surface 1A of the first transparent substrate 1. The light-shielding members B11 and B12 are arranged at a first pitch P1 in the first direction X. The light-shielding members B11 and B12 are each formed in a strip shape extending in a direction crossing the first direction X and are parallel to each other as will be described later.

The organic insulating film I1 covers the light-shielding members B11 and B12 and also covers the first transparent substrate 1.

The light-shielding layer B2 includes a plurality of light-shielding members B21 and B22 disposed on the organic insulating film I1. The light-shielding members B21 and B22 are in contact with the organic insulating film I1 and are arranged at a first pitch P1 in the first direction X. The light-shielding members B21 and B22 overlap the light-shielding members B11 and B12, respectively, and are each formed in a strip shape parallel to the light-shielding members B11 and B12. That is, the light-shielding member B21 is located immediately above the light-shielding member B11 with the organic insulating film I1 therebetween, and the light-shielding member B22 is located immediately above the light-shielding member B12 with the organic insulating film I1 therebetween.

The organic insulating film I2 covers the light-shielding members B21 and B22 and also covers the organic insulating film I1.

The light-shielding layer B3 includes a plurality of light-shielding members B31 and B32 disposed on the organic insulating film I2. The light-shielding members B31 and B32 are in contact with the organic insulating film I2 and are arranged at a first pitch P1 in the first direction X. The light-shielding members B31 and B32 overlap the light-shielding members B21 and B22, respectively, and are each formed in a strip shape parallel to the light-shielding members B21 and B22. That is, the light-shielding member B31 is located immediately above the light-shielding member B21 with the organic insulating film I2 therebetween, and the light-shielding member B32 is located immediately above the light-shielding member B22 with the organic insulating film I2 therebetween.

The organic insulating film I3 covers the light-shielding members B31 and B32 and also covers the organic insulating film I2.

The light-shielding layer B4 includes a plurality of light-shielding members B41 and B42 disposed on the organic insulating film I3. The light-shielding members B41 and B42 are in contact with the organic insulating film I3 and are arranged at a first pitch P1 in the first direction X. The light-shielding members B41 and B42 overlap the light-shielding members B31 and B32, respectively, and are each formed in a strip shape parallel to the light-shielding members B31 and B32. That is, the light-shielding member B41 is located immediately above the light-shielding member B31 with the organic insulating film I3 therebetween, and the light-shielding member B42 is located immediately above the light-shielding member B32 with the organic insulating film I3 therebetween.

The organic insulating film I4 covers the light-shielding members B41 and B42 and also covers the organic insulating film I3.

The light-shielding layer B5 includes a plurality of light-shielding members B51 and B52 disposed on the organic insulating film I4. The light-shielding members B51 and B52 are in contact with the organic insulating film I4 and are arranged at a first pitch P1 in the first direction X. The light-shielding members B51 and B52 overlap the light-shielding members B41 and B42, respectively, and are each formed in a strip shape parallel to the light-shielding members B41 and B42. That is, the light-shielding member B51 is located immediately above the light-shielding member B41 with the organic insulating film I4 therebetween, and the light-shielding member B52 is located immediately above the light-shielding member B42 with the organic insulating film I4 therebetween.

The overcoat layer OC covers the light-shielding members B51 and B52 and also covers the organic insulating film I4. That is, the overcoat layer OC covers the louver portion 3.

The first electrodes E1 are disposed on the overcoat layer OC. The first electrodes E1 are also arranged at a second pitch P2 in the first direction X. The second pitch P2 is smaller than the first pitch P1. As will be described later, the first electrodes E1 are each formed in a strip shape extending in a direction crossing the first direction X and are parallel to each other.

The first alignment film AL1 covers the first electrodes E1 and the overcoat layer OC. The first alignment film AL1 is also in contact with the liquid crystal layer LC1.

In the first substrate S1 described above, for example, each of the light-shielding members B11 and B12 corresponds to a first light-shielding member, each of the light-shielding members B21 and B22 corresponds to a second light-shielding member, each of the light-shielding members B31 and B32 corresponds to a third light-shielding member, the organic insulating film I1 corresponds to a first organic insulating film, the organic insulating film I2 corresponds to a second organic insulating film and the organic insulating film I3 corresponds to a third organic insulating film.

The second substrate S2 includes a second transparent substrate 2, a second electrode E2 and a second alignment film AL2.

The second transparent substrate 2 has an inner surface 2A opposed to the liquid crystal layer LC1 and an outer surface 2B that is the opposite side of the inner surface 2A. The outer surface 2B is opposed to the polarizer PL1 shown in FIG. 1.

The second electrode E2 is disposed on the inner surface 2A of the second transparent substrate 2. The second alignment film AL2 covers the second electrode E2 and is in contact with the liquid crystal layer LC1.

A spacer SP is formed, for example, in a columnar shape and disposed between the first substrate S1 and the second substrate S2 to hold a gap of, for example, 10 μm or more.

The liquid crystal layer LC1 is formed between the first alignment film AL1 and the second alignment film AL2. The thickness TLC of the liquid crystal layer LC1 along the third direction Z is 10 μm or more.

The liquid crystal lens portion 4 is configured by the first electrodes E1, the liquid crystal layer LC1 and the second electrode E2.

The first transparent substrate 1 and the second transparent substrate 2 are insulating substrates such as a glass substrate and a resin substrate.

The light-shielding members B11, B12, B21, B22, B31, B32, B41, B42, B51 and B52 are formed of a resin material containing, for example, a black pigment, but may be formed of a metal material.

The organic insulating films I1, I2, I3 and I4 and the overcoat layer OC are formed of a transparent resin material such as an acrylic resin.

The first and second electrodes E1 and E2 are transparent electrodes formed of a transparent conductive material such as indium tin oxide (ITO) and indium zinc oxide (IZO). The first and second alignment films AL1 and AL2 are horizontal alignment films having an alignment regulating force that is substantially parallel to the X-Y plane.

Here is a description of a case where each of the light-shielding members B11, B21, B31, B41 and B51 is formed of a resin material.

Each of the light-shielding members B11, B21, B31, B41 and B51 has a substantially rectangular section.

The light-shielding members B11, B21, B31, B41 and B51 have the same width "a" along the first direction X, and the width "a" is, for example, 5.5 μm. The distance "b" between adjacent light-shielding members arranged in the first direction X is larger than the width "a", and is, for example, 14.5 μm. The first pitch P1 is, for example, 20 μm.

The light-shielding members B11, B21, B31, B41 and B51 have thicknesses T11, T12, T13, T14 and T15, respectively along the third direction Z. These thicknesses are the same and are each preferably 1 μm or more, for example, 2 μm.

The greater the thickness of each of the light-shielding members, the smaller the number of light-shielding layers to configure the louver portion 3. On the other hand, if the thickness of each of the light-shielding members is small, a large number of light-shielding layers are required to collimate transmitted light.

The organic insulating films I1, I2, I3 and I4 have thicknesses T1, T2, T3 and T4, respectively along the third direction Z. These thicknesses are the same and are each 8.5 μm, for example.

The overcoat layer OC is thinner than the organic insulating film I1. That is, the thickness T5 of the overcoat layer OC along the third direction Z is smaller than the thickness T1, and is 2.5 μm, for example.

The liquid crystal layer LC1 is thicker than the organic insulating film I1. That is, the thickness TLC of the liquid crystal layer LC1 is greater than the thickness T1, and is 10 μm, for example. The overcoat layer OC is thus thinner than the liquid crystal layer LC1.

Figure 5:
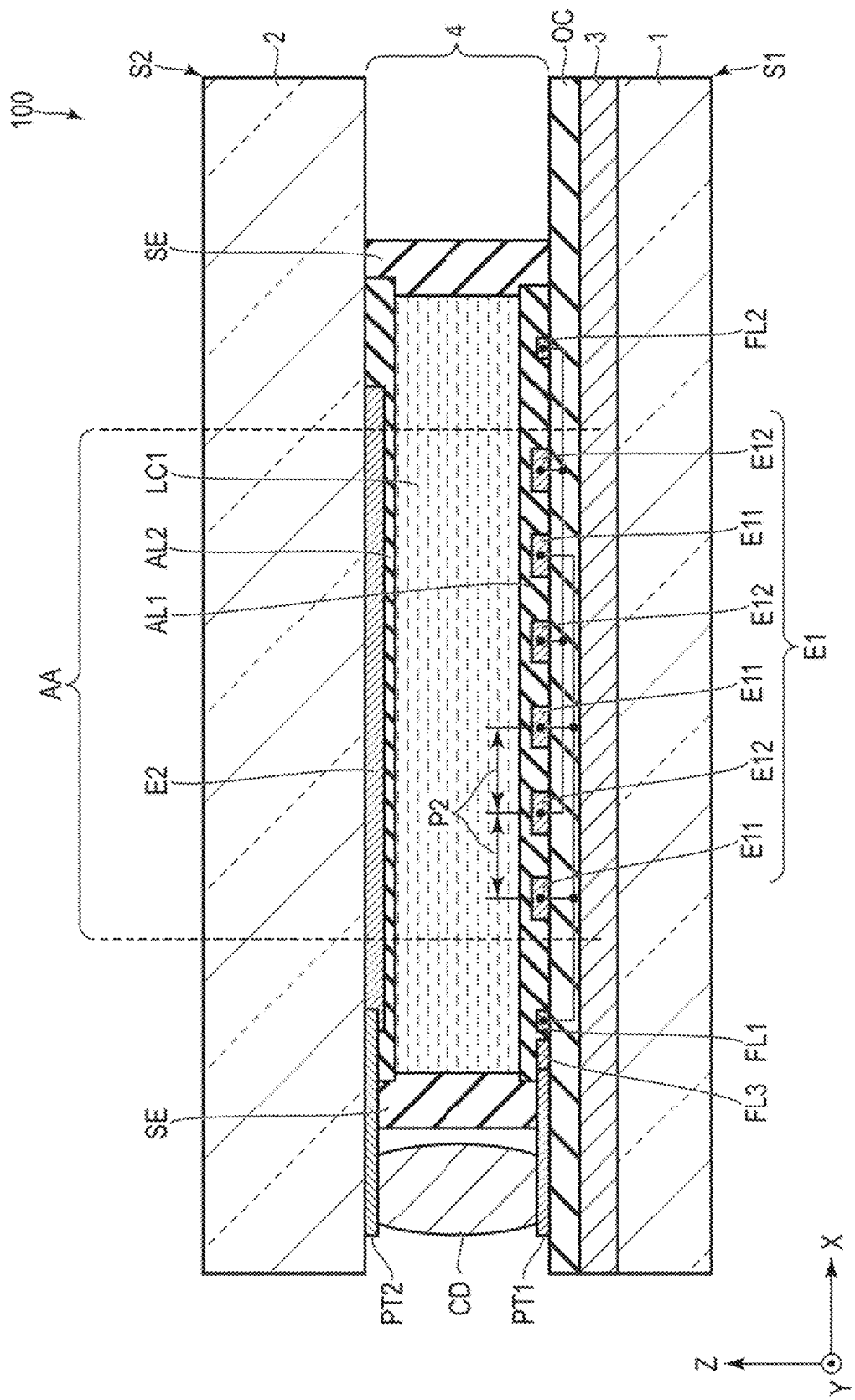
FIG. 5 is a sectional view showing an example of a configuration of a liquid crystal lens portion 4 of the liquid crystal device 100 shown in FIG. 4.

FIG. 5 is a sectional view showing an example of a configuration of the liquid crystal lens portion 4 shown in FIG. 4. In FIG. 5, the louver portion 3 in the first substrate S1 is simplified, and no spacer is shown. The liquid crystal layer LC1 is sealed by a sealant SE.

The first electrodes E1 include a plurality of first strip electrodes E11 and a plurality of second strip electrodes E12. The first and second strip electrodes E11 and E12 are alternately arranged at the second pitch P2 in the first direction X.

The first strip electrodes E11 are electrically connected to each other and are configured to be applied with a first voltage via a feeder line FL1. The second strip electrodes E12 are electrically connected to each other and are configured to be applied with a second voltage via a feeder line FL2. The first voltage is different from the second voltage. Accordingly, a potential difference is formed between adjacent first and second strip electrodes E11 and E12, with the result that an electric field can be formed in the liquid crystal layer LC1.

A feeding terminal PT1 is electrically connected to a feeder line FL3 and pulled outside the sealant SE. The feeding terminal PT1 is exposed from the first alignment film AL1.

A feeding terminal PT2 is electrically connected to the second electrode E2 and pulled outside the sealant SE. The feeding terminal PT2 is located directly above the feeding terminal PT1. The feeding terminal PT2 is exposed from the second alignment film AL2.

A conductive member CD is disposed between the feeding terminals PT1 and PT2 to electrically connect them to each other.

The optical function of the liquid crystal device 100 will be described below with reference to FIGS. 6 and 7. Note that FIGS. 6 and 7 show only the configurations necessary for descriptions.

Figure 6:
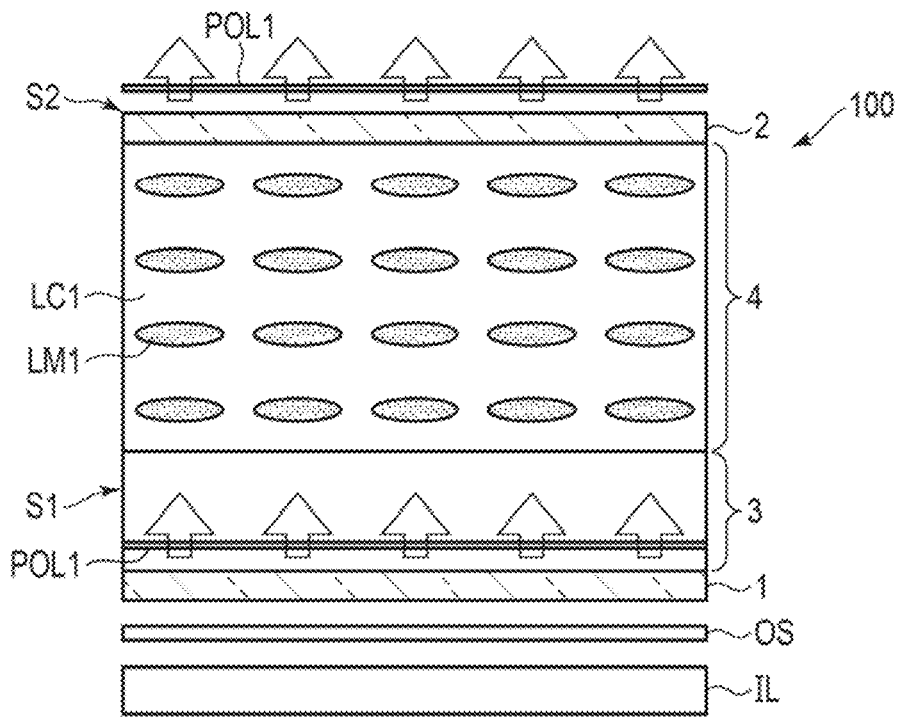
FIG. 6 is a schematic diagram showing an OFF-state liquid crystal device 100 including a liquid crystal layer LC1 in which no electric field is formed.
Figure 7:
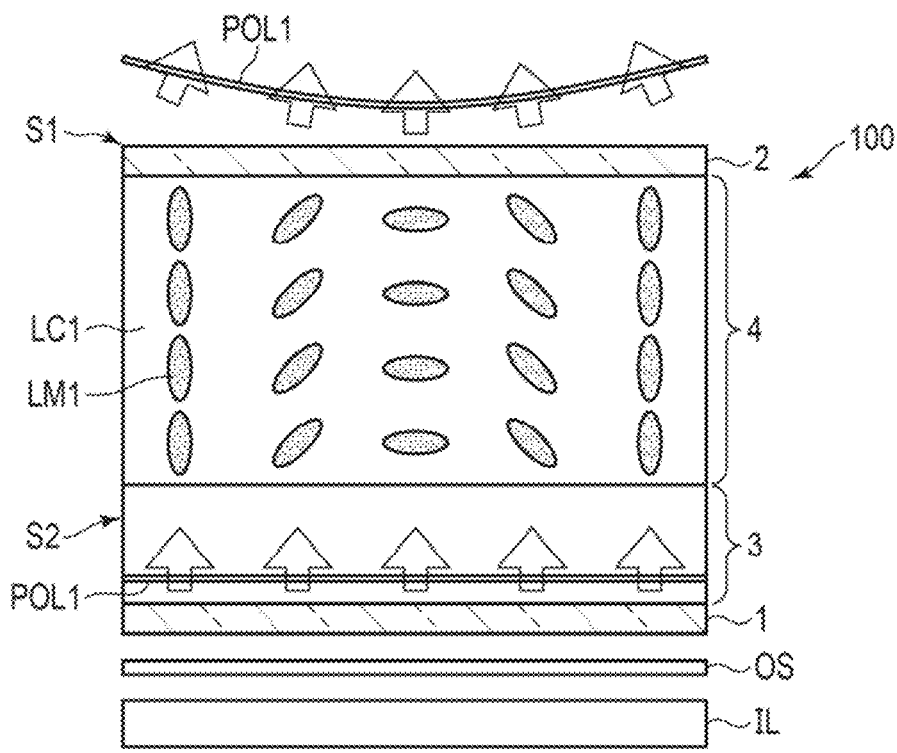
FIG. 7 is a schematic diagram showing an ON-state liquid crystal device 100 including a liquid crystal layer LC1 in which an electric field is formed.

FIG. 6 is a schematic diagram showing the liquid crystal device 100 in an OFF state in which no electric field is formed in the liquid crystal layer LC1.

Of the illumination light emitted from the illumination device IL, p-polarized light POL1 transmitted through the optical sheet OS enters the first substrate S1 of the liquid crystal device 100. Then, the p-polarized light POL1 is collimated in the louver portion 3 of the first substrate S1. The collimated p-polarized light POL1 enters the liquid crystal lens portion 4.

In the liquid crystal layer LC1 in an OFF state, the liquid crystal molecules LM1 are initially aligned. In this OFF state, the liquid crystal layer LC1 has a substantially uniform refractive-index distribution. Thus, the p-polarized light POL1, which is light incident upon the liquid crystal lens portion 4, is hardly refracted (or diverged) but transmitted through the liquid crystal layer LC1.

If, therefore, the liquid crystal lens portion 4 of the liquid crystal device 100 is in an OFF state, illumination light with a relatively small degree of divergence can be formed, and an image can be displayed in a narrow viewing angle mode by light transmitted through the display panel PNL.

FIG. 7 is a schematic diagram showing the liquid crystal device 100 in an ON state in which an electric field is formed in the liquid crystal layer LC1.

If the liquid crystal layer LC1 has, for example, positive dielectric constant anisotropy, the liquid crystal molecules LM1 are aligned so that their major axes follow the electric field in the ON state where an electric field is formed in the liquid crystal layer LC1. In the liquid crystal layer LC1, for example, an electric field is formed in accordance with a potential difference between adjacent first electrodes E1 and a potential difference between each of the first electrodes E1 and the second electrode E2. When the electric field acts on the liquid crystal layer LC1, an area in which the liquid crystal molecules LM1 rise substantially perpendicularly to the substrate, an area in which the liquid crystal molecules LM1 are maintained in the initial alignment state, an area in which the liquid crystal molecules LM1 rise obliquely to the substrate, and the like are formed in the liquid crystal layer LC1.

The liquid crystal molecules LM1 have refractive anisotropy $\Delta n$. Thus, the ON-state liquid crystal layer LC1 has a refractive index distribution or a retardation distribution which corresponds to the alignment state of the liquid crystal molecules LM1. The retardation is expressed by $\Delta n \cdot d$, where d is the thickness of the liquid crystal layer LC1 (or a gap between the first and second substrates S1 and S2).

In the above-described ON state, when the collimated p-polarized light POL1 is transmitted through the liquid crystal layer LC1, it is diverged under the influence of the refractive index distribution in the liquid crystal layer LC1. The degree of divergence of the transmitted light can be controlled by a voltage to be applied to the liquid crystal layer LC1.

Therefore, when the liquid crystal lens portion 4 of the liquid crystal device 100 is turned on, illumination light having a relatively high degree of divergence can be formed, and an image can be displayed in a wide viewing angle mode by light transmitted through the display panel PNL.

As described above, the liquid crystal device 100 including the louver portion 3 and the liquid crystal lens portion 4 makes it possible to control the emission direction of illumination light emitted from the illumination device IL.

The liquid crystal device 100 also makes it possible to make the entire device thinner than a case where an optical element having a louver portion on a substrate is required, in addition to a liquid crystal element having a liquid crystal lens portion between paired substrates.

Figure 8:
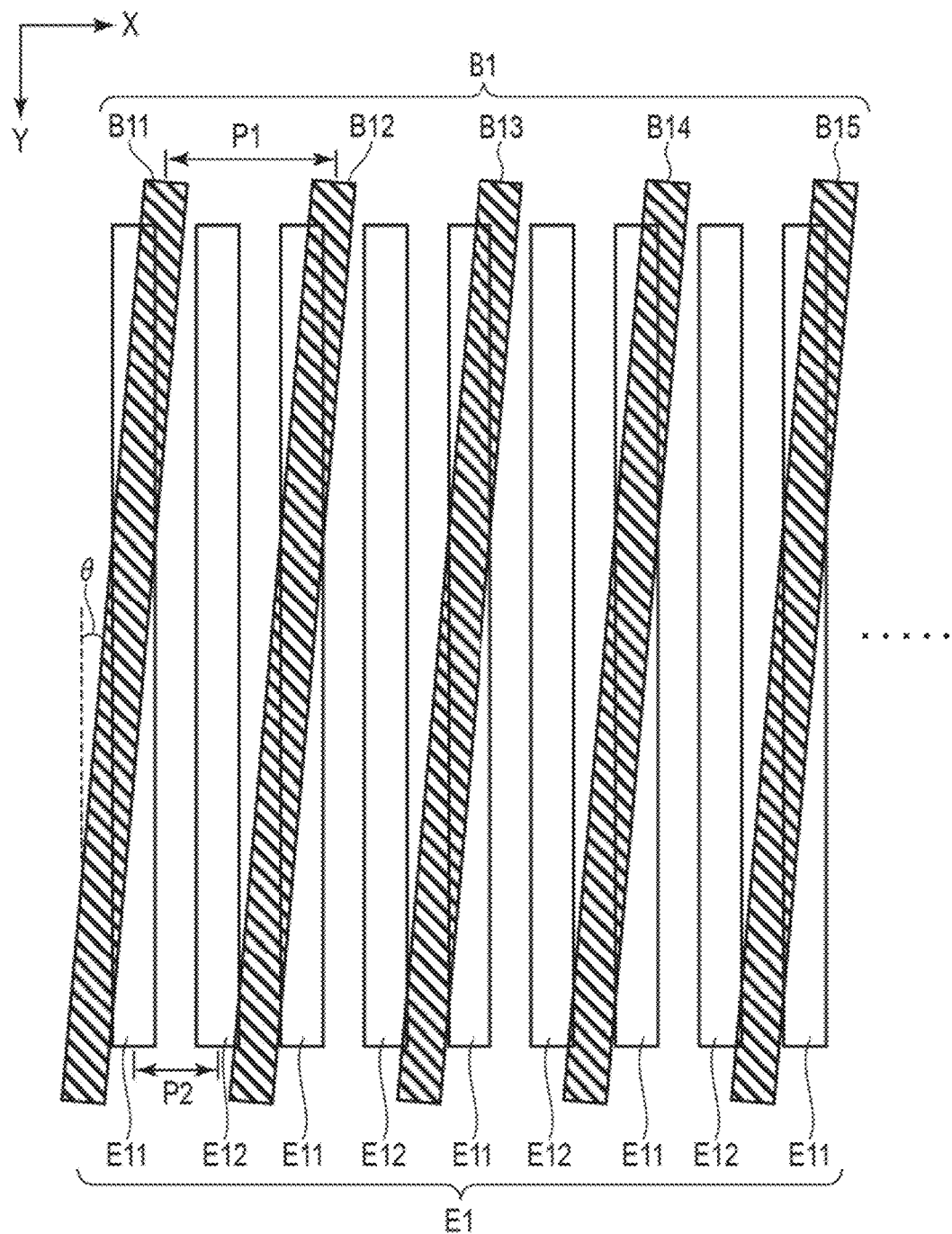
FIG. 8 is a plan view showing a first electrode E1 and a light-shielding layer B1.

FIG. 8 is a plan view showing one of the first electrodes E1 and the light-shielding layer B1. The light-shielding layer B1 is one of the light-shielding layers constituting the louver portion, and the other light-shielding layers B2 to B5 overlap immediately above the light-shielding layer B1.

As described above, the first electrodes E1 include first strip electrodes E11 and second strip electrodes E12 arranged alternately in the first direction X. The first and second strip electrodes E11 and E12 extend in the second direction Y.

The light-shielding layer B1 includes light-shielding members B11 to B15 arranged in order in the first direction X. The light-shielding members B11 to B15 are parallel to each other and extend in a direction other than the second direction Y. That is, the light-shielding members B11 to B15 intersect the first electrodes E1 in planar view. In other words, the light-shielding members B11 to B15 extend in a direction other than the extending direction of the first and second strip electrodes E11 and E12.

Paying attention to the light-shielding member B11, for example, the reference orientation indicated by the dotted line in FIG. 8 is parallel to the second direction Y, and the light-shielding member B11 extends in a direction rotated by angle $\theta$ clockwise from the reference orientation. The angle $\theta$ is an acute angle and is 4°, for example.

In configuring the liquid crystal lens portion 4, the voltage applied to the liquid crystal layer LC1 can be more reduced as the second pitch P2 becomes smaller, and the thickness TLC of the liquid crystal layer LC1 can be decreased. It is therefore desirable that the second pitch P2 be set to a minimum pitch at which the first electrodes E1 can be machined.

The first pitch P1 is set from the viewpoint of required louver performance, aperture ratio, machinability of the light-shielding members, and the like. An example of setting the first pitch P1 will be described later.

Figure 9:
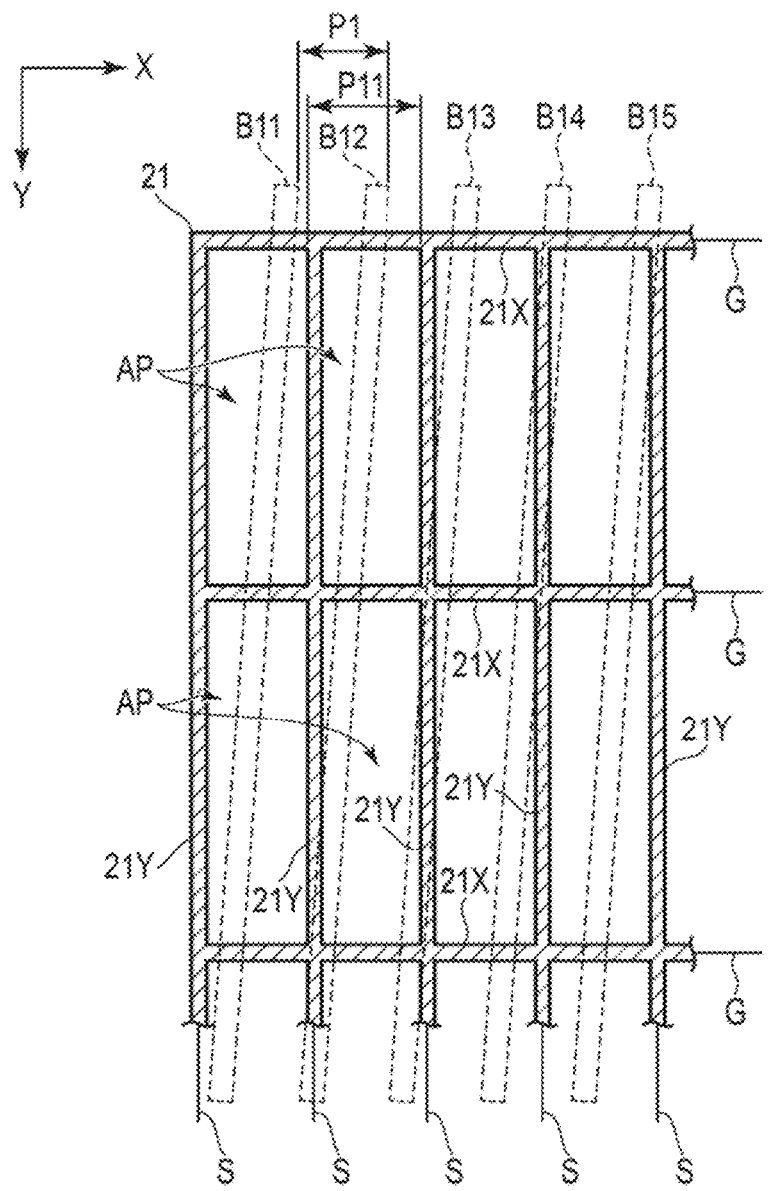
FIG. 9 is a plan view showing a light-shielding layer 21 and the light-shielding layer B1 of the display panel PNL.

FIG. 9 is a plan view showing one of the light-shielding layers 21 and light-shielding layer B1 of the display panel PNL. The light-shielding layer B1 is one of the light-shielding layers constituting the louver portion, which is shown by a dotted line.

The light-shielding layer 21 has first portions 21X extending in the first direction X and second portions 21Y extending in the second direction Y, and is formed in a lattice shape. For example, the first portions 21X overlap the scanning lines G, and the second portions 21Y overlap the signal lines S.

Square apertures AP are formed in the light-shielding layer 21 and overlap the pixels PX or pixel electrodes PE shown in FIG. 3. As one example, the apertures AP are each formed in a rectangular shape extending in the second direction Y, but the shape is not limited to the rectangle.

The apertures AP are arranged in a matrix in the first and second directions X and Y. For example, the apertures AP are arranged at a pixel pitch P11 in the first direction X.

The light-shielding members B11 to B15 of the light-shielding layer B1 intersect the first and second portions 21X and 21Y of the light-shielding layer 21. The first pitch P1 of the light-shielding members B11 to B15 is smaller than the pixel pitch P11. The pixel pitch P11 is, for example, 20 µm to 100 µm.

As described above, in the display device DSP, when the liquid crystal device 100 and the display panel PNL overlap each other, the light-shielding layers B1 and 21 intersect each other, and the pixel pitch P11 and the first pitch P1 are different from each other. Thus, undesired moire can be suppressed and display quality can be prevented from lowering.

FIG. 10 is a plan view showing one of the first electrodes E1 and another light-shielding layer B1. The light-shielding layer B1 is one of the light-shielding layers constituting the louver portion.

The light-shielding layer B1 shown in FIG. 10 differs from the light-shielding layer B1 shown in FIG. 8 in that the light-shielding members are formed in a zigzag shape.

The light-shielding members B11 to B15 are parallel to each other and extend in a direction other than the second direction Y. The light-shielding members B11 to B15 intersect the first electrodes E1 in planar view.

Paying attention to the light-shielding member B11, it has a plurality of first portions BA and a plurality of second portions BB. The first portions BA and the second portions BB extend in mutually different directions and are alternately arranged along the second direction Y. The reference orientation indicated by the dotted line in FIG. 10 is parallel to the second direction Y. The first portions BA extend in a direction rotated by angle θA clockwise from the reference orientation, and the second portions BB extend in a direction rotated by angle θB counterclockwise from the reference orientation. The angles θA and θB are equal, and both are acute angles and are 4°, for example.

The larger a pitch P3 along the second direction Y between adjacent first and second portions BA and BB, the lower the visibility of moire. As one example, the pitch P3 is 100 μm or more.

Figure 11:
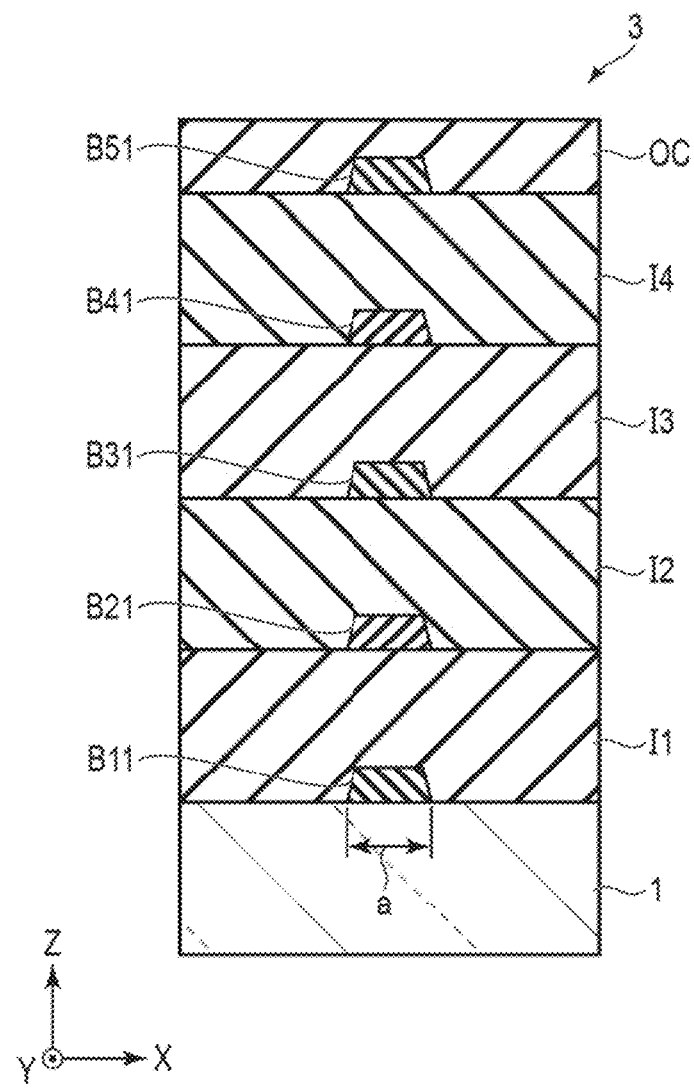
FIG. 11 is a sectional view showing an example of each of light-shielding members constituting a louver portion 3.
Figure 12:
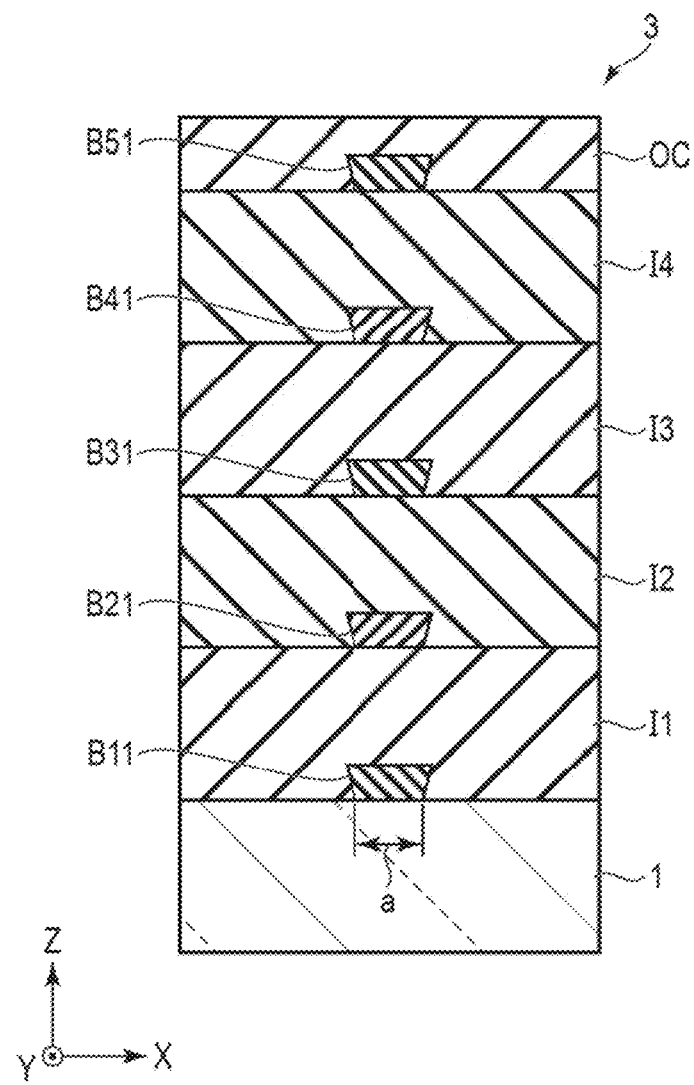
FIG. 12 is a sectional view showing another example of each of the light-shielding members constituting the louver portion 3.

FIGS. 11 and 12 are sectional views each showing another example of each of the light-shielding members constituting the louver portion 3. The examples shown in FIGS. 11 and 12 differ from the example shown in FIG. 4 in that each of the light-shielding members B11, B21, B31, B41 and B51 has a trapezoidal section.

In the example shown in FIG. 11, each of the light-shielding members B11, B21, B31, B41 and B51 has a forward-tapered section in which the width "a" of each of the members decreases upward along the third direction Z.

In the example shown in FIG. 12, each of the light-shielding members B11, B21, B31, B41 and B51 has a reverse-tapered section in which the width "a" of each of the members increases upward along the third direction Z.

The light-shielding members B11, B21, B31, B41 and B51 are each formed of a resin material, for example, but the light-shielding member B11 may be formed of a metal material.

In addition, some of the light-shielding members B11, B21, B31, B41 and B51 may have a forward-tapered section and the other light-shielding members may have a reverse-tapered section.

Figure 13:
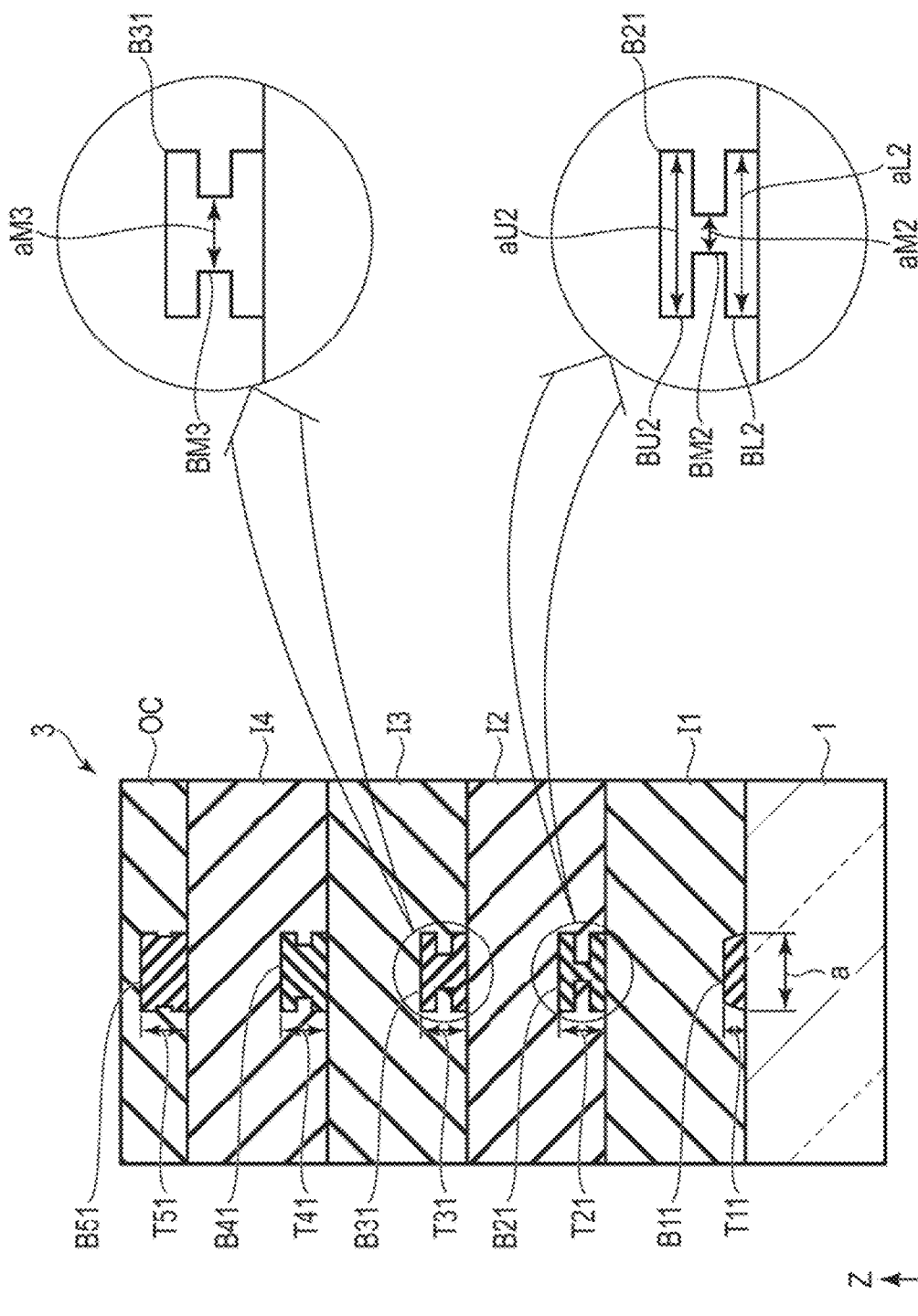
FIG. 13 is a sectional view showing still another example of each of the light-shielding members constituting the louver portion 3.

FIG. 13 is a sectional view showing another example of each of the light-shielding members constituting the louver portion 3. The example shown in FIG. 13 differs from the example shown in FIG. 4 in that at least one of the light-shielding members B11, B21, B31, B41 and B51 has a constricted section in its middle.

In the example shown in FIG. 13, the light-shielding member B11 is formed of a metal material (for example, molybdenum tungsten alloy), and the light-shielding members B21, B31, B41 and B51 are each formed of a resin material. The thicknesses T21, T31, T41 and T51 of the light-shielding members B21, B31, B41 and B51 are equal and, for example, 2 μm. The light-shielding member B11 is thinner than each of the light-shielding members B21, B31, B41 and B51. That is, the thickness T11 is smaller than the thickness T21 and is, for example, less than 1 μm.

Focusing on the light-shielding member B21, it has a lower portion BL2, an upper portion BU2 and an intermediate portion BM2. The lower portion BL2 is a portion opposed to the first transparent substrate 1 or the organic insulating film I1. The upper portion BU2 is a portion opposed to the liquid crystal layer LC1 shown in FIG. 4. The intermediate portion BM2 is a portion located between the lower portion BL2 and the upper portion BU2.

The width aL2 of the lower portion BL2 is equal to the width aU2 of the upper portion BU2. Note that the width aL2 may be smaller or larger than the width aU2.

The width aM2 of the intermediate portion BM2 is smaller than each of the widths aL2 and aU2.

Comparing the shapes of the light-shielding members B21, B31, B41 and B51, the width of the intermediate portion tends to increase with distance from the light-shielding member B11.

Comparing, for example, the light-shielding members B21 and B31, the width aM2 of the intermediate portion BM2 of the light-shielding member B21 is smaller than the width aM3 of the intermediate portion BM3 of the light-shielding member B31.

Note that the width in this description corresponds to a length along the first direction X.

FIG. 14 is a diagram illustrating the aperture ratio of the louver portion 3.

Each of the light-shielding members B21, B31, B41 and B51 is located directly above the light-shielding member B11, and each of the light-shielding members B22, B32, B42 and B52 is located directly above the light-shielding member B12.

The aperture ratio of the louver portion 3 can be defined as (b/(a+b)), where "a" is the width of the light-shielding member B11 and "b" is the interval between the light-shielding members B11 and B12. The width "a" is desirably 3 μm or more, the interval "b" is desirably 10 μm or more, and the aperture ratio is desirably 60% or more.

Figure 15:
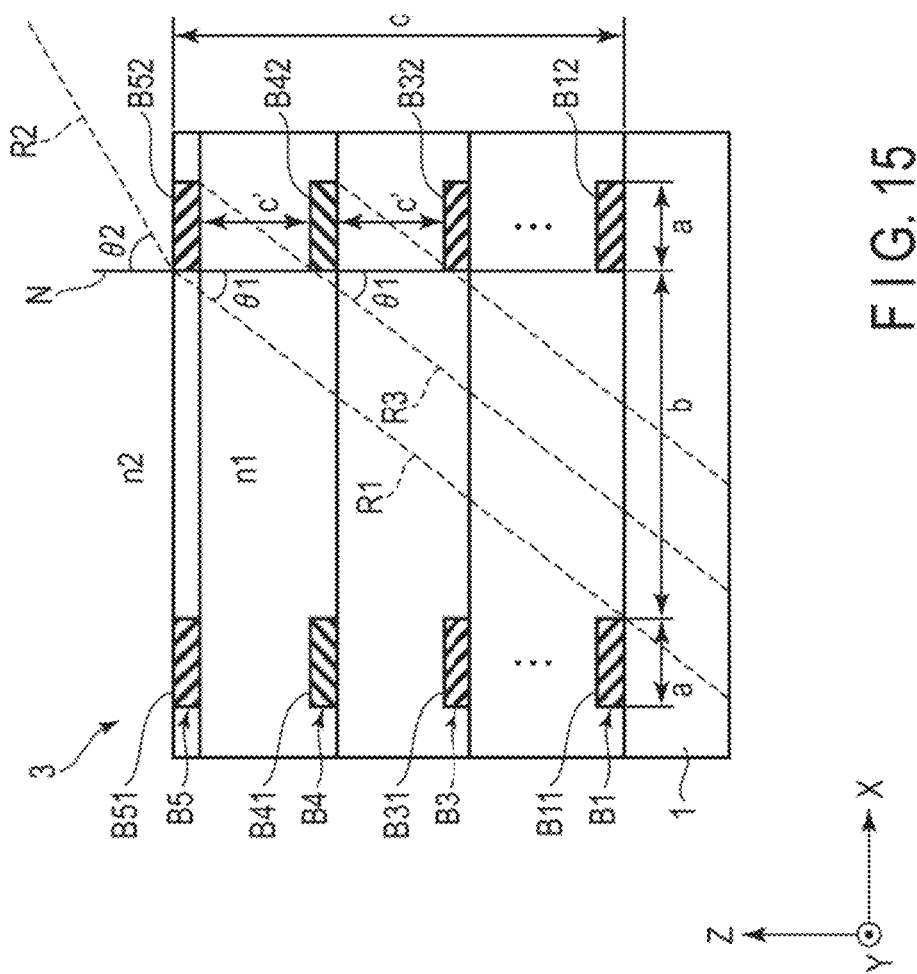
FIG. 15 is a diagram illustrating the thickness "c" of the louver portion.

FIG. 15 is a diagram illustrating the thickness "c" of the louver portion 3.

It is assumed here that the louver portion 3 is configured by five light-shielding layers B1 to B5, and the length from the bottom surface of the lowermost light-shielding layer B1 to the top surface of the uppermost light-shielding layer B5 along the third direction Z is defined as the thickness "c" of the louver portion 3.

An optical path R1 which passes nearby the light-shielding member B11 between the light-shielding members B11 and B12 and reaches the light-shielding member B52, and an optical path R2 through which light is emitted into the air from the louver portion 3 are indicated by the dotted lines in FIG. 15.

When the refractive index of the organic insulating film covering each of the light-shielding layers B1 to B5 is n1, the refractive index of air is n2, the angle of the optical path R1 with respect to the normal N of the first transparent substrate 1 is θ1, and the angle of the optical path R2 with respect to the normal N is θ2, a relationship among these definitions is represented by an equation (1) in FIG. 15.

In the equation (1), sin θ1 is expressed as an equation (2) in FIG. 15. Substituting the equation (2) into the equation (1) and solving for "c", the relationship of an equation (3) holds. That is, the thickness "c" of the louver portion 3 is set based on the equation (3). The angle θ2 in the equation (3) is the lower limit value of the angle formed between an optical path of light to be shielded and the normal N.

Next is a description of an interval "c'" along the third direction Z of the light-shielding layers B1 to B5. Among the optical paths parallel to the optical path R1, for example, an optical path R3 which passes nearby the light-shielding member B42 and reaches the light-shielding layer B52 between the light-shielding members B42 and B52 is indicated by a dotted line in FIG. 15. In order to block the light beam passing through the optical path R3 by the light-shielding member B42 or B52, it is required that the interval "c'" satisfies the relationship of the equation (4) in FIG. 15.

The number of light-shielding layers constituting the louver portion 3 is determined based on the intervals "c'" and "b".

According to the foregoing embodiment, a liquid crystal device for controlling a viewing angle, which can be thinned, and a display device including the liquid crystal device, can be provided.

Based on the liquid crystal device which has been described in the above-described embodiments, a person having ordinary skill in the art may achieve a liquid crystal device with an arbitral design change; however, as long as they fall within the scope and spirit of the present invention, such a liquid crystal device shall be encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A liquid crystal device comprising:
   a first transparent substrate;
   a plurality of first light-shielding members each formed in a strip shape and arranged at a first pitch on an inner surface of the first transparent substrate;
   a first organic insulating film which is transparent and covers the first light-shielding members;
   a plurality of second light-shielding members which overlap the first light-shielding members, respectively and each of which is formed in a strip shape parallel to the first light-shielding members;
   a second organic insulating film which is transparent and covers the second light-shielding members;
   a plurality of third light-shielding members which overlap the second light-shielding members, respectively and each of which is formed in a strip shape parallel to the second light-shielding members;
   a third organic insulating film which is transparent and covers the third light-shielding members;
   an overcoat layer disposed above the third organic insulating film;
   a plurality of first electrodes each formed in a strip shape and arranged on the overcoat layer at a second pitch that is smaller than the first pitch;
   a first alignment film which covers the first electrodes;
   a second transparent substrate;
   a second electrode disposed on an inner surface of the second transparent substrate and opposed to the first electrodes;
   a second alignment film which covers the second electrode; and
   a liquid crystal layer disposed between the first alignment film and the second alignment film.

2. The liquid crystal device of claim 1, wherein the first light-shielding members, the second light-shielding members and the third light-shielding members are formed of a resin material and have an equal thickness.

3. The liquid crystal device of claim 1, wherein:
   the first organic insulating film, the second organic insulating film and the third organic insulating film have an equal thickness; and
   the overcoat layer is thinner than the first organic insulating film.

4. The liquid crystal device of claim 3, wherein the liquid crystal layer is thicker than the first organic insulating film.

5. The liquid crystal device of claim 4, wherein the liquid crystal layer has a thickness of 10 µm or more.

6. The liquid crystal device of claim 1, wherein the first electrodes intersect the first light-shielding members in planar view.

7. The liquid crystal device of claim 1, wherein:
   the first light-shielding members are formed of a metal material;
   the second light-shielding members and the third light-shielding members are formed of a resin material; and
   the first light-shielding members are thinner than the second light-shielding members and the third light-shielding members.

8. The liquid crystal device of claim 7, wherein:
   the second light-shielding members and the third light-shielding members each have a lower portion opposed to the first transparent substrate, an upper portion opposed to the liquid crystal layer and an intermediate portion between the lower portion and the upper portion; and
   the intermediate portion has a width that is smaller than a width of each of the lower portion and the upper portion.

9. The liquid crystal device of claim 8, wherein the intermediate portion of each of the second light-shielding members has a width that is smaller than a width of the intermediate portion of each of the third light-shielding members.

* * * * *